(12) United States Patent  
Toto

(10) Patent No.: US 7,044,233 B2  
(45) Date of Patent: May 16, 2006

(54) COMBINED DIGGER AND MUSHROOM COMPOST COMPACTING ASSEMBLY

(75) Inventor: Remo Toto, Lincoln University, PA (US)

(73) Assignee: Remo's Mushroom Services, Inc., Avondale, PA (US)

( * ) Notice: Subject to any disclaimer, the term of this patent is extended or adjusted under 35 U.S.C. 154(b) by 0 days.

(21) Appl. No.: 10/900,932

(22) Filed: Jul. 28, 2004

(65) Prior Publication Data

US 2006/0021767 A1    Feb. 2, 2006

(51) Int. Cl.  
  A01B 33/02    (2006.01)
(52) U.S. Cl. .......................................... 172/48; 172/125
(58) Field of Classification Search ................ 111/118, 111/121, 122, 131, 200; 172/35, 48, 125, 172/518  
See application file for complete search history.

(56) References Cited

U.S. PATENT DOCUMENTS

| | | | | |
|---|---|---|---|---|
| 3,776,528 A | * | 12/1973 | Toto | 425/62 |
| 3,881,707 A | * | 5/1975 | Toto | 241/101.742 |
| 4,231,305 A | * | 11/1980 | van der Lely | 111/119 |
| 5,511,497 A | * | 4/1996 | Toto | 111/118 |
| 6,186,083 B1 | * | 2/2001 | Toto | 111/131 |
| 6,817,286 B1 | * | 11/2004 | Toto | 100/152 |
| 2003/0147774 A1 | * | 8/2003 | Celli | 422/28 |
| 2004/0065215 A1 | * | 4/2004 | Toto | 100/152 |
| 2005/0000708 A1 | * | 1/2005 | Bjorge | 172/21 |

* cited by examiner

Primary Examiner—Meredith Petravick  
Assistant Examiner—Alexandra Pechhold

(57) ABSTRACT

A combined digger and compost compacting assembly comprises a digger unit and a compacting unit. The digger unit has a drive shaft which includes a plurality of outwardly extending digger tines for digging into the compost in a mushroom bed as the assembly is moved longitudinally from one end of the bed to the opposite of the bed. The compacting unit includes at least one roller for compacting the compost after the digging tines have dug through the compost. The digger unit and the compacting unit are detachably mounted together for joint movement during the compost treating operation. The units can be separated from each other and moved independently of each other to a different mushroom bed after the compost treating operation has been completed.

19 Claims, 3 Drawing Sheets

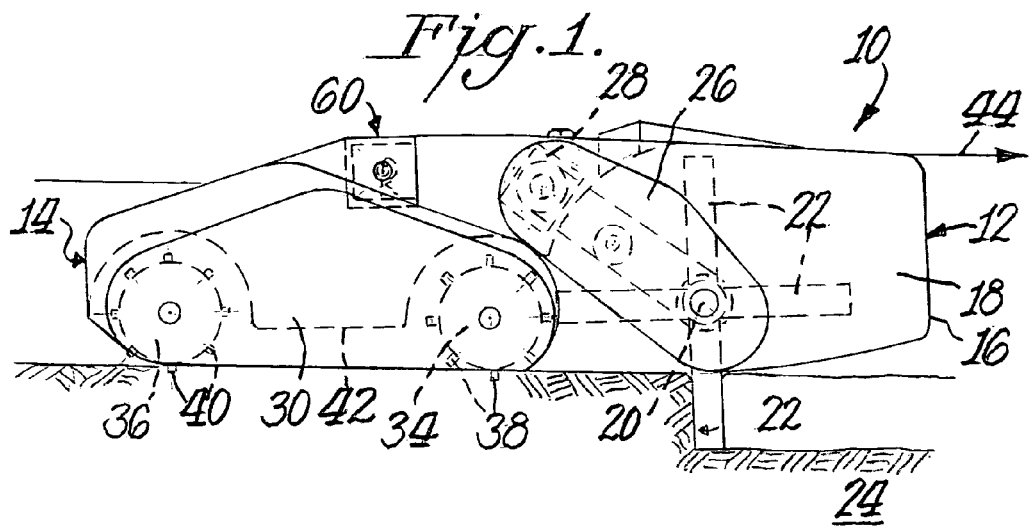
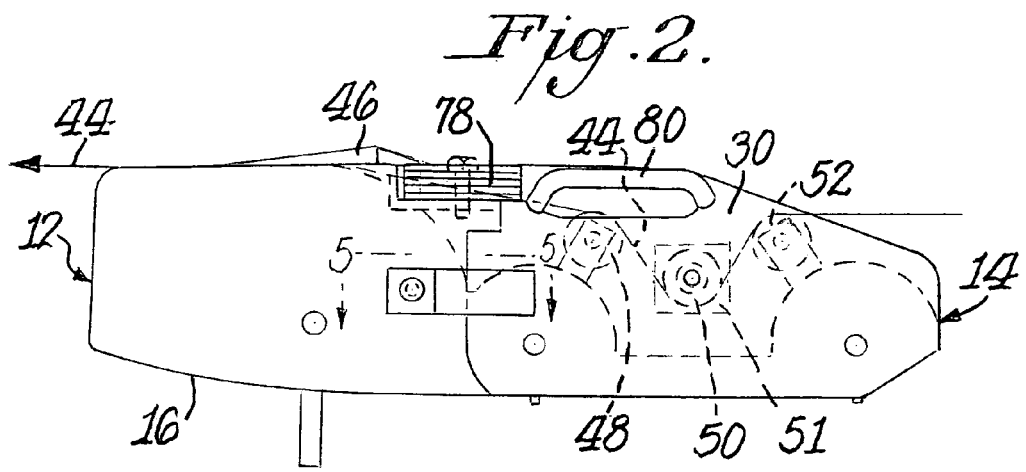
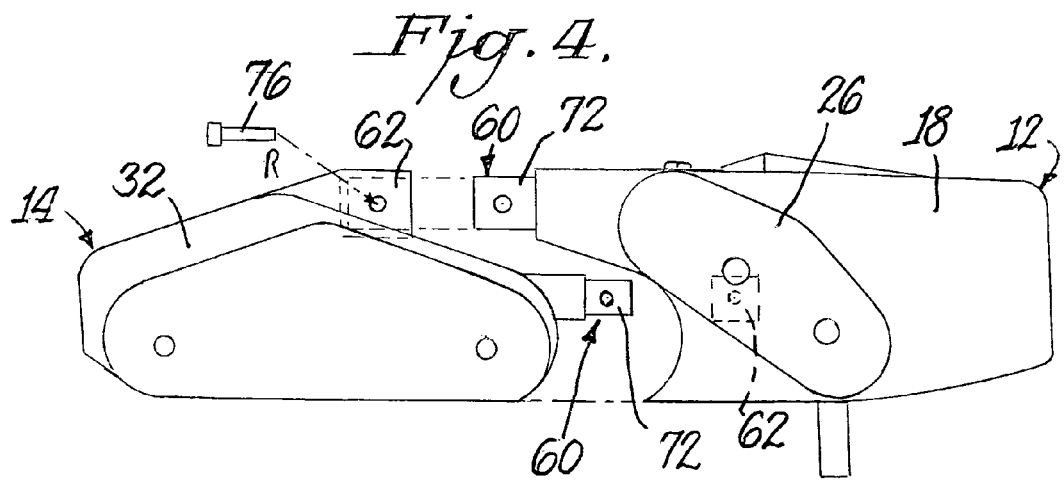

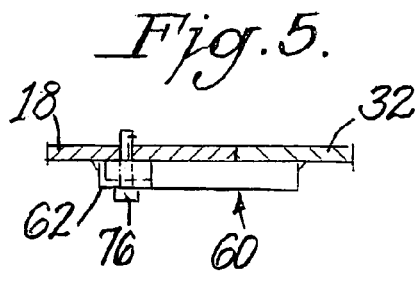
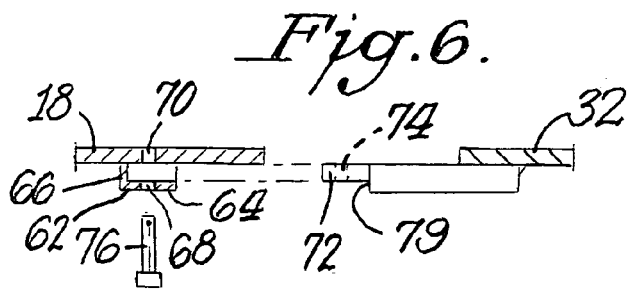
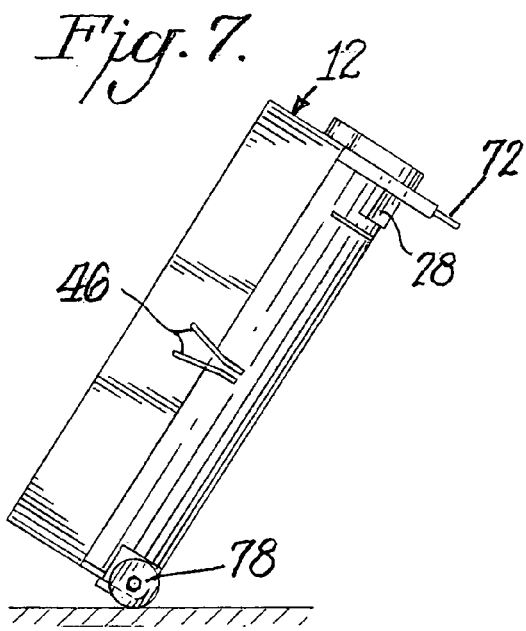
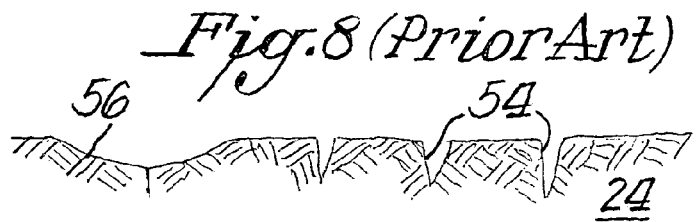
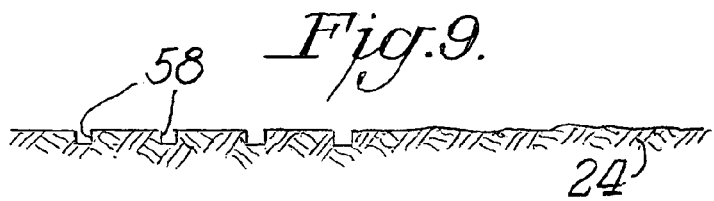

COMBINED DIGGER AND MUSHROOM COMPOST COMPACTING ASSEMBLY

BACKGROUND OF THE INVENTION

In the growing of mushrooms the mushroom compost is generally placed in a mushroom bed. A digger is moved longitudinally down the bed from one end of the bed to the other. The digger has tines which dig into the compost so that, for example, spawn and supplement can mixed into the compost. A compactor which is usually in the form of a pair of rollers then moves over the compost to compact and level the surface of the compost. Where such digger and compacting units are combined the resultant assembly could be quite heavy weighing, for example, over 300 pounds. This makes it difficult to move the assembly from one bed to another.

SUMMARY OF THE INVENTION

An object of this invention is to provide a combined digger and mushroom compost compacting assembly which can be readily moved from one bed to another.

A further object of this invention is to provide such an assembly which improves the treatment of the compost.

In accordance with this invention the assembly comprises a digger unit and a separate compacting unit. Each of the units includes a housing having at least one side wall. A drive shaft is mounted to the side wall of the digger unit for carrying a plurality of outwardly extending tines which dig into the compost when the drive shaft is rotated. At least one roller is mounted in the compacting unit to compact the compost after the tines have rotated through the compost. Both units are detachably mounted together so that the units can move jointly when connected together during operation of the assembly and so that the units can be separated from each other and move individually to the next mushroom compost bed after an operation has been completed.

In a preferred practice of the invention the digger unit includes a transporter wheel to facilitate the rolling of the digger unit from one bed to the next bed. The compacting unit could be moved back to its starting end of the bed by reversing the direction of movement of the drive chain and then the compacting unit could be lifted from the first bed and moved to the second bed.

In a preferred practice of the invention the detachable mounting structure is provided at two locations of the assembly. Preferably one location is at or near the top of the side wall of each housing with the other location being at a central area of the side walls. The mounting structure may be a tongue secured to the side wall of one unit which is inserted into a keeper in the side wall of the other unit with a pin or other fastener joining the tongue and keeper together by extending through aligned holes in the tongue and keeper. The holes could be aligned by providing the keeper with an end wall so that the keeper hole is aligned with the tongue hole when the tongue contacts the end wall. Additional alignment could be achieved through the use of a shoulder on one side walls abutting the keeper.

A BRIEF DESCRIPTION OF THE DRAWINGS

FIG. 1 is a left side elevational view of a combined digger and mushroom compost compacting assembly in accordance with this invention;

FIG. 2 is a right side elevational view of the assembly shown in FIG. 1;

FIG. 4 is a left side elevational view showing the two units of the assembly of FIGS. 1–3 detached from each other;

FIG. 5 is a cross-sectional view taken through FIG. 2 along the line 5—5;

FIG. 6 is a cross-sectional view in elevation of the portion of the assembly shown in FIG. 5 in its detached condition;

FIG. 7 is a side elevational view showing the digger unit being transported when detached from the compacting unit;

FIG. 8 is a schematic cross-sectional view in elevation showing a mushroom compost bed in accordance with prior art practices; and FIG. 9 is a view similar to FIG. 8 showing a mushroom compost bed after being treated with the assembly of FIGS. 1–7.

DETAILED DESCRIPTION

Figure 3:
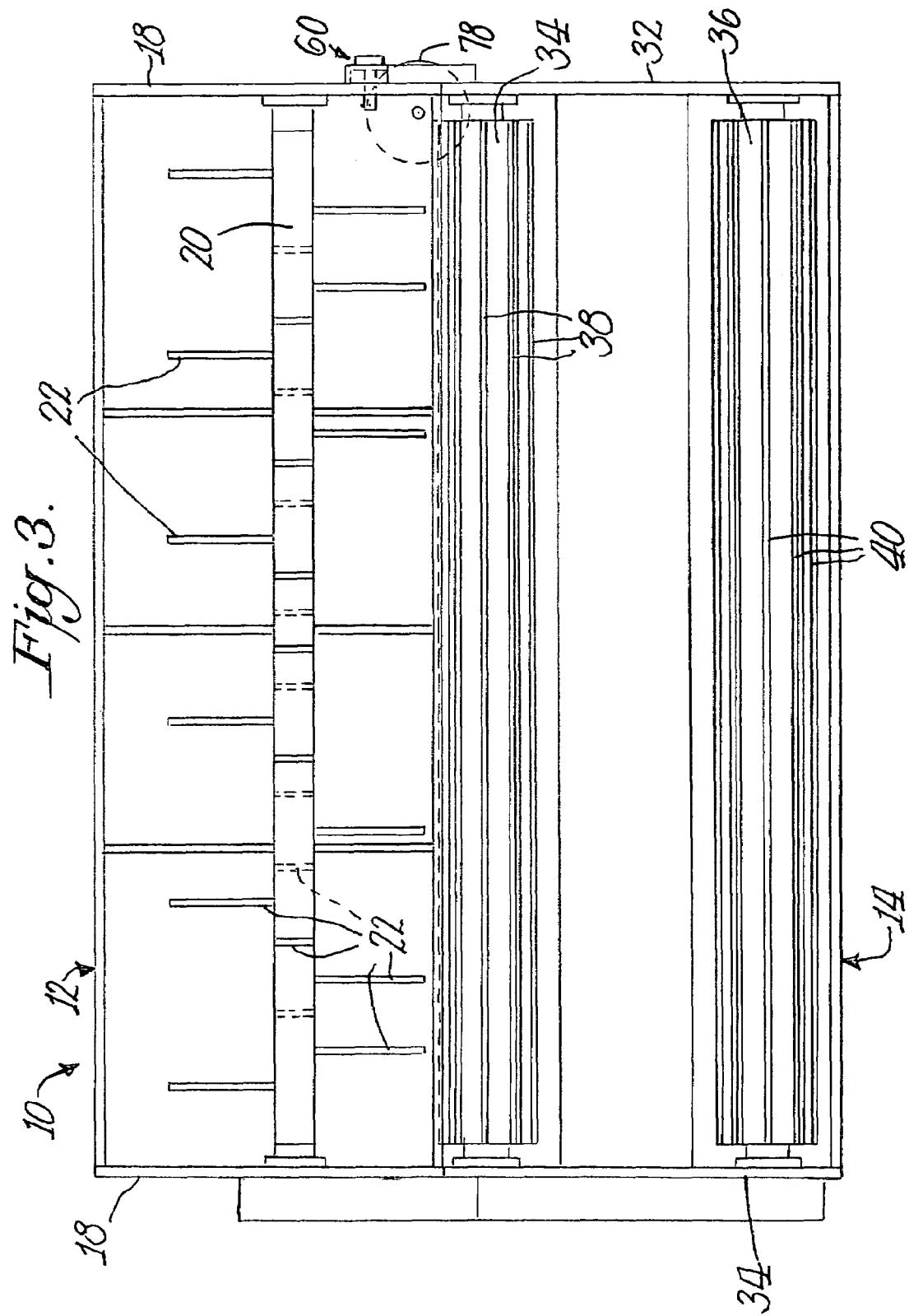
FIG. 3 is a bottom plan view of the assembly shown in FIGS. 1–2.

The present invention is directed in general to a combined digger and mushroom compost compacting assembly which includes a digger unit and a compacting unit. Each of these units may generally be formed for operational purposes in manners known in the art. Reference is made, for example, to U.S. Pat. Nos. 5,511,497 and 6,186,083 as well as U.S. application Ser. No. 10/624,982 filed Jul. 21, 2003 by the inventor herein. All of the details of these patents and application are incorporated herein by reference thereto.

As shown in FIGS. 1–3 the assembly 10 includes a digger unit 12 and a compacting unit 14. Digger unit 12 is in the form of a housing 16 which has a pair of side walls 18, 18. A shaft 20 is rotatably secured between the side walls 18, 18. A plurality of tines 22 is mounted around and extends outwardly from the shaft for digging into the compost 24 as shown in FIGS. 1 and 3. Shaft 20 is driven in any suitable manner. FIGS. 1 and 4, for example, illustrate a housing shell 26 mounted to one of the side walls 18 for providing a chain guard. Housing 16 also includes a hydraulic motor 28 which is connected to shaft 20 in a known manner for rotating the shaft 20. As shaft 20 rotates the tines 22 dig into the compost as shown in FIG. 1 and indicated by the arrow.

Compacting unit 14 also includes a housing 30 having side walls 32, 32. A pair of rollers 34, 36 is rotatably mounted to the longitudinal side walls 32, 32. Roller 34 includes spaced outwardly extending cleats or ribs 38 spaced around roller 34, while roller 36 includes cleats 40. Preferably cleats 38 are longer and thus extend outwardly a greater distance than cleats 40. The housing 14 is shaped and dimensioned so that the rollers 34, 36 extend downwardly below the lowest portion of the housing into contact with the compost 24. Stated differently the lowest portion of the housing, such as lower edge 42 is disposed a distance, such as two inches, above the compost bed 24. This minimizes any drag being otherwise created which would occur if the housing were in contact with the compost as the assembly is being moved longitudinally on the mushroom bed.

The assembly 10 is driven by a chain drive in a known manner. FIG. 2, for example, illustrates a chain 44 to extend into the housing 30 by first passing through chain guide 46 of housing 16. FIG. 7 also illustrates the chain guide 46 which is generally in the form of a pair of spaced outwardly diverging plates. Chain 44 then passes over roller 48 and is meshed with drive sprocket 50 and passes over roller 52. Sprocket 50 is driven by hydraulic motor 51. Each end of chain 44 is mounted to an opposite end of the mushroom bed. The direction of rotation of sprocket 50 controls the direction of movement of assembly 10. Thus, as shown in FIG. 2, assembly 10 is moved from right to left from the first end of the bed to the opposite end of the bed where the digging and compacting operations sequentially take place. The assembly 10 may be returned to the first end of the bed by reversing the direction of movement of chain 44 in a known manner.

As assembly 10 is moved in the forward direction shown by the arrow in FIG. 2 the freely mounted rollers 34 and 36 press against and compact the compost. The cleats or longitudinal ribs 38, 40 also slightly penetrate into the compost.

FIG. 8 shows the top area of compost 24 when treated by conventional digging and compacting devices. As shown therein cracks 54 become formed in the top surface of the compost. Such cracks can be of relatively large size. In addition, indents or waves 56 could also result particularly where the digger uses a sled that makes contact with the compost.

In contrast to FIG. 8, FIG. 9 shows the general formation of the compost 24 by use of the assembly 10. Because there is no sled and because the only portions of the compacting unit that make contact with the compost are the rollers 34, 36, a generally smooth level surface is achieved having spaced indentations 58 created by the cleats or ribs 34, 36. These small indentations are desirable to retain moisture. The cleats are initially formed in a depth determined by the longer cleats 38.

Assembly 10 and its digger unit 12 differ from conventional digger units in that digger unit 12 does not include any sled which would press downwardly on the compost creating cracks. Additionally, assembly 10 advantageously also assures that only the compacting rollers in the compacting unit will press against the compost.

In accordance with this invention the digger unit 12 and the compacting unit 14 are made of separate individual units which are detachably connected together by detachable mounting structure 60. Preferably two sets of mounting structure is used. As shown in FIG. 4 one set of mounting structure 60 is located at or near the top of the side walls 18, 32 of the units 12, 14. A second detachable mounting structure 60 is located in a generally central portion of those side walls. If desired, only one such detachable mounting structure could be used or more than two can be used. Two, however, is the preferred practice of the invention. For the sake of simplicity both mounting structures 60, 60 are mounted to the same walls.

Each detachable mounting structure might best be understood by reference to FIGS. 5–6. As shown in FIG. 6 a keeper 62 is mounted to side wall 18. Keeper 62 has an outer wall 64 and an end wall 66. A hole 68 extends through outer wall 64 in line with a hole 70 in housing wall 18. The wall 32 of the compacting unit includes a tongue 72 having a hole 74. When tongue 72 is telescoped into keeper 62 the holes 68, 74 and 70 are aligned so that a locking pin or other suitable fastener 76 can then be inserted through the aligned holes to lock the side walls 18 and 32 together. Proper alignment is achieved when the end of tongue 72 contacts end wall 66 and also when a shoulder 79 on wall 32 contacts the outer wall 64 of keeper 62 as shown in FIG. 5.

As shown in FIG. 4 in the preferred practice of the invention where two sets of detachable mounting structure are used the keeper of one set is located on one of the units while the keeper of the other set is located on the other unit. FIG. 4 illustrates the keeper 62 of the upper detachable mounting structure to be on the compacting unit with the tongue 72 on the digger unit, while the central detachable mounting structure 60 has the keeper 62 on the digging unit and the tongue 72 on the compacting unit. The invention could be practiced, however, where the keeper is on either or both units.

Once the assembly 10 has moved longitudinally from one end of the compost bed to the opposite end and the compost treating operation has been completed, the assembly must be moved to a different mushroom bed to treat the compost of the different or next mushroom bed. In accordance with the invention this is done by removing the pin 66 from each detachable mounting structure so that the two units could be pulled apart and separated from each other. When the two units 12, 14 are separated the hydraulic lines are also detached to facilitate the separation of the units and permit the independent movement of each movement with respect to each other. Digger unit 12 might weigh, for example, 165 pounds. Two workers could lift digger unit 14 from the first mushroom bed so that it could be transported to the next or different mushroom bed which would require moving the digging unit 14 the entire length of the bed to locate it at the first end of the next mushroom bed. To facilitate this movement at least one transporting wheel 78 is mounted on one end of digger unit 12. Digger unit 14 may then be placed on the floor of the mushroom house and conveniently rolled to the desired location of the next mushroom bed.

Compacting unit 16 must also be removed to be placed in the next bed. Since compacting unit 16 is connected to the chain drive, initially the chain drive may be reversed in its direction to move the compacting unit back to its starting position of the bed that had just been treated. This would place unit 16 near the intended end of the next bed. Compacting unit 16 might weigh, for example, 142 pounds. Two workers could lift compacting unit 16 from its mushroom bed and then place it in the next bed. If desired a handle 80 (FIG. 2) could be provided on compacting unit 14 to facilitate the lifting.

The invention may be practiced in various manners without departing from the spirit of this invention. For example, while each detachable mounting structure includes a pin 60, any type of fastener could be used to secure adjacent walls of each unit together. Similarly, other forms of detachable mounted structure such as clamps, etc. could be used instead of a keeper/tongue. While the drawings illustrate particular structure for the digger unit and the compacting unit other structure could be used within the teaching of detachably mounting the two units together so that the units move jointly during the compost treating operation, but can be moved separately when it is desired to use the same assembly on a different mushroom bed or for storage or repair purposes.

What is claimed is:

1. A combined digger and mushroom compost compacting assembly comprising a digger unit, said digger unit comprising a digger housing having at least one side wall, a drive shaft mounted at said side wall, a digger drive motor in said digger housing operatively connected to said shaft, a plurality of digger tines mounted around and extending outwardly from said shaft for digging into the compost in a mushroom bed as said assembly is moved longitudinally from one end of the mushroom bed to an opposite end of the bed, a compacting unit, said compacting unit comprising a compacting housing having at least one side wall, at least one compacting roller rotatably mounted to said side wall for compacting the compost after said digger tines have dug into the compost as said assembly is moved longitudinally from the one end of the mushroom bed to the opposite end, and detachable mounting structure detachably securing said digger unit to said compacting unit to create two conditions of said digger unit and said compacting unit with respect to each other, one of said conditions being when said digger unit and said compacting unit are connected together and move jointly during operation of said assembly when said assembly is moved longitudinally on the bed and the other of said conditions being when said digger unit and said compacting unit are completely separated from each other and can be manually moved separately one at a time to a different mushroom bed and then be reconnected to each other back to said one condition for further operation on the different mushroom bed, in combination with a mushroom bed, a drive mechanism mounted to said mushroom bed and engaged with one of said digger unit and said compacting unit, said drive mechanism jointly moving both said digger unit and said compacting unit in said one condition, and said drive mechanism solely moving said one of said digger unit and said compacting unit in said second condition.

2. The assembly of claim 1 including a transporter wheel mounted to said digger unit at a location to permit said digger unit to be rotated out of said first condition and thereby dispose said transporter wheel to the lowermost position of said digger unit to facilitate the rolling and transportation of said digger unit after said digger unit has been detached from said compacting unit.

3. The assembly of claim 1 including a plurality of longitudinally extending cleats mounted on the outer surface of and extending transversely across and outwardly from said compacting unit roller.

4. The assembly of claim 1 wherein said detachable mounting structure is mounted to adjacent side walls of said digger unit and said compacting unit.

5. The assembly of claim 4 wherein there are two sets of said detachable mounting structure.

6. The assembly of claim 1 wherein said compacting unit includes at least two spaced transversely parallel compacting rollers.

7. A combined digger and mushroom compost compacting assembly comprising a digger unit, said digger unit comprising a digger housing having at least one side wall, a drive shaft mounted at said side wall, a digger drive motor in said digger housing operatively connected to said shaft, a plurality of digger tines mounted around and extending outwardly from said shaft for digging into the compost in a mushroom bed as said assembly is moved longitudinally from one end of the mushroom bed to an opposite end of the bed, a compacting unit, said compacting unit comprising a compacting housing having at least one side wall, at least one compacting roller rotatably mounted to said side wall for compacting the compost after said digger tines have dug into the compost as said assembly is moved longitudinally from the one end of the mushroom bed to the opposite end, detachable mounting structure detachably securing said digger unit to said compacting unit to create two conditions of said digger unit and said compacting unit with respect to each other, one of said conditions being when said digger unit and said compacting unit are connected together and move jointly during operation of said assembly when said assembly is moved longitudinally on the bed and the other of said conditions being when said digger unit and said compacting unit are completely separated from each other and can be manually moved separately one at a time to a different mushroom bed and then be reconnected to each other back to said one condition for further operation on the different mushroom bed, including a chain drive having a first end extending outwardly beyond said digger unit for being mounted to one end of a mushroom bed, said chain drive having a second end extending outwardly beyond said compacting unit for being mounted to an opposite end of the mushroom bed, said chain drive being mounted to said compacting unit, a motor driven sprocket engaged with said chain drive to control the direction of movement of said compacting unit for moving said compacting unit in a longitudinal direction whereby said compacting unit and said digger unit are moved jointly during the treatment of compost in the mushroom bed and whereby said compacting unit alone may be moved in a reverse direction when said compacting unit has been detached from said digger unit.

8. The assembly of claim 7, in combination with a mushroom bed having one end and an opposite end, said first end of said chain drive being mounted to said one end of said mushroom bed, and said second end of said chain drive being mounted to said opposite end of said mushroom bed.

9. A combined digger and mushroom compost compacting assembly comprising a digger unit, said digger unit comprising a digger housing having at least one side wall, a drive shaft mounted at said side wall, a digger drive motor in said digger housing operatively connected to said shaft, a plurality of digger tines mounted around and extending outwardly from said shaft for digging into the compost in a mushroom bed as said assembly is moved longitudinally from one end of the mushroom bed to an opposite end of the bed, a compacting unit, said compacting unit comprising a compacting housing having at least one side wall, at least one compacting roller rotatably mounted to said side wall for compacting the compost after said digger tines have dug into the compost as said assembly is moved longitudinally from the one end of the mushroom bed to the opposite end, detachable mounting structure detachably securing said digger unit to said compacting unit whereby said digger unit and said compacting unit are connected together and move jointly during operation of said assembly when said assembly is moved longitudinally on the bed and whereby said digger unit and said compacting unit may be completely separated from each other and moved separately to a different mushroom bed and then be reconnected to each other for further operation on the different mushroom bed, wherein there are two of said rollers in said compacting unit, and said cleats of one of said rollers being longer than said cleats of the other of said rollers.

10. The assembly of claim 9 wherein there are two sets of said detachable mounting structure, each of said sets of said detachable mounting structure including a keeper having an outer wall spaced from said side wall of said unit to which said keeper is mounted and an end wall, a hole extending through said outer wall in line with a hole extending through said side wall to which said keeper is mounted, a tongue secured to the side wall of the other of said units, said tongue having a hole in line with said holes in said outer wall and in said side wall, and a fastener extending through said aligned holes.

11. The assembly of claim 10 wherein said keeper of one of said sets of detachable mounting structure is located on said side wall of said digging unit and said keeper in the other of said sets of detachable mounting structure is located on said side wall of said compacting unit.

12. The assembly of claim 11 wherein each of said detachable mounting structure includes aligning structure for aligning said holes in said side wall and in said tongue and in said outer wall.

13. The assembly of claim 9 wherein there are two sets of said detachable mounting structure, one set of said detachable mounting structure being located generally near the top of said side walls and the other set of said detachable mounting structure is located generally at a central portion of said side walls.

14. The assembly of claim 9 wherein there are two sets of detachable mounting structure located on the same side walls of said digger unit and said compacting unit.

15. A combined digger and mushroom compost compacting assembly comprising a digger unit, said digger unit comprising a digger housing having at least one side wall, a drive shaft mounted at said side wall, a digger drive motor in said digger housing operatively connected to said shaft, a plurality of digger tines mounted around and extending outwardly from said shaft for digging into the compost in a mushroom bed as said assembly is moved longitudinally from one end of the mushroom bed to an opposite end of the bed, a compacting unit, said compacting unit comprising a compacting housing having at least one side wall, at least one compacting roller rotatably mounted to said side wall for compacting the compost after said digger tines have dug into the compost as said assembly is moved longitudinally from the one end of the mushroom bed to the opposite end, detachable mounting structure detachably securing said digger unit to said compacting unit whereby said digger unit and said compacting unit are connected together and move jointly during operation of said assembly when said assembly is moved longitudinally on the bed and whereby said digger unit and said compacting unit may be completely separated from each other and moved separately to a different mushroom bed and then be reconnected to each other for further operation on the different mushroom bed, said detachable mounting structure including a keeper having an outer wall spaced from said side wall of said unit to which said keeper is mounted and an end wall, a hole extending through said outer wall in line with a hole extending through said side wall to which said keeper is mounted, a tongue secured to the side wall of the other of said units, said tongue having a hole in line with said holes in said outer wall and in said side wall, and a fastener extending through said aligned holes.

16. The assembly of claim 15 wherein there are two sets of said detachable mounting structure, and one set of said detachable mounting structure being located generally near the top of said side walls and the other set of said detachable mounting structure is located generally at a central portion of said side walls.

17. The assembly of claim 16 wherein said keeper of one of said sets of detachable mounting structure is located on said side wall of said digging unit and said keeper in the other of said sets of detachable mounting structure is located on said side wall of said compacting unit.

18. The assembly of claim 15 wherein each of said detachable mounting structure includes aligning structure for aligning said holes in said side wall and in said tongue and in said outer wall.

19. The assembly of claim 17 wherein said sets of detachable mounting structure are located on the same side walls of said digger unit and said compacting unit.

* * * * *